(12) United States Patent
Hoeftberger et al.

(10) Patent No.: US 12,346,150 B2
(45) Date of Patent: Jul. 1, 2025

(54) CONTINUOUS TIME SYNCHRONIZATION

(71) Applicant: B&R INDUSTRIAL AUTOMATION GMBH, Eggelsberg (AT)

(72) Inventors: Oliver Hoeftberger, Eggelsberg (AT); Franz Profelt, Eggelsberg (AT)

(73) Assignee: ABB SCHWEIZ AG, Baden (CH)

( * ) Notice: Subject to any disclaimer, the term of this patent is extended or adjusted under 35 U.S.C. 154(b) by 224 days.

(21) Appl. No.: 18/223,271

(22) Filed: Jul. 18, 2023

(65) Prior Publication Data
US 2024/0028066 A1    Jan. 25, 2024

(30) Foreign Application Priority Data

Jul. 19, 2022    (AT) .............................. A 50539/2022

(51) Int. Cl.
*G06F 1/12*    (2006.01)
*G06F 1/14*    (2006.01)

(52) U.S. Cl.
CPC . *G06F 1/12* (2013.01); *G06F 1/14* (2013.01)

(58) Field of Classification Search
None
See application file for complete search history.

(56) References Cited

U.S. PATENT DOCUMENTS 6,981,063 B1    12/2005 Eggers et al.
7,356,617 B2     4/2008 Suzuki et al.
(Continued)

FOREIGN PATENT DOCUMENTS

| CN | 111953469 | 11/2020 |
|----|-----------|---------|
| CN | 111970080 | 11/2020 |

(Continued)

OTHER PUBLICATIONS

Aoun et al., "Distributed Task Synchronization in Wireless Sensor Networks," [Lecture Notes in Computer Science], 18$^{th}$ Int'l Conf., Austin, TX, XP019114799, pp. 150-165 (2015).
(Continued)

*Primary Examiner* — Danny Chan
(74) *Attorney, Agent, or Firm* — GREENBLUM & BERNSTEIN, P.L.C.

(57) ABSTRACT

A method and network for time synchronization of at least one master and at least one slave, which is an interrupt-capable network component. A time offset between a master time and a slave time is determined. A first time fraction of the determined time offset is adjusted in first synchronization step(s) using a time jump. The first time fraction corresponds to an integer multiple of the cycle duration of the interrupt(s) and a second time fraction of the determined time offset is adjusted in a number of successive second synchronization steps using frequency alignment and/or a time jump. The second time fraction corresponds to a non-integer multiple from the range ]−1.0[ and ]0.1[ of cycle duration of the interrupt(s). In each of the number of second synchronization steps, an actual occurring cycle duration of the interrupt(s) deviates from the predefined cycle duration by no more than a predefined deviation.

10 Claims, 4 Drawing Sheets

(56) References Cited

U.S. PATENT DOCUMENTS

| | | | |
|---|---|---|---|
| 2009/0003307 A1* | 1/2009 | Yang | H04W 56/00 |
| | | | 370/350 |
| 2012/0023262 A1* | 1/2012 | Berke | G06F 1/324 |
| | | | 709/248 |
| 2016/0191752 A1* | 6/2016 | Takitsune | H04N 5/12 |
| | | | 348/518 |
| 2016/0209866 A1* | 7/2016 | Jeter | G06F 1/12 |
| 2018/0299853 A1 | 10/2018 | Wang et al. | |
| 2021/0042253 A1* | 2/2021 | Poulsen | G06F 13/4004 |
| 2022/0150305 A1 | 5/2022 | Weber et al. | |
| 2022/0269627 A1* | 8/2022 | Teferi | G06F 13/362 |

FOREIGN PATENT DOCUMENTS

| | | |
|---|---|---|
| EP | 3 996 298 | 5/2022 |
| WO | 00/44194 | 7/2000 |

OTHER PUBLICATIONS

Austria Search Report conducted in counterpart Austria Appln. No. A 50539/2022 (Mar. 2, 2023).

* cited by examiner

CONTINUOUS TIME SYNCHRONIZATION

CROSS-REFERENCE TO RELATED APPLICATION

This application claims priority under 35 U.S.C. § 119(a) to Austria Application No. A5053912022 filed Jul. 19, 2022, the disclosure of which is expressly incorporated by reference herein in its entirety.

BACKGROUND

1. Field of the Invention

The present invention describes a method for time synchronization of at least one master and at least one slave in a network, wherein the at least one master predefines a master time and sends at least one synchronization message including the master time via the network to the at least one slave, wherein the at least one slave, on which a slave time runs, uses the synchronization message to adjust the slave time to the master time using synchronization, wherein the at least one slave is an interrupt-capable network component of the network and uses a timer which accesses the slave time to generate at least one interrupt, which recurs at predefined regular cycle durations.

2. Discussion of Background Information

In principle, completely different hardware components such as central processing units, bus modules, drive modules, bus couplers, IO modules having integrated network connections, cameras, HMI devices, network-integrated sensors and actuators, network infrastructure (switches, bridges, etc.) etc., can be provided as network components of a network. Each network component in a network has at least one clock that is used to control the work processes in the network component itself. For example, this clock can predefine the usable CPU processing time of each computer process. Workflows between network components in the network are also adjusted using the clock. This allows different workflows to be controlled in a network.

In principle, a distinction is made between hardware-based clocks and logical clocks. Hardware-based clocks are, for example, quartz oscillators having counting registers, the quartz oscillator specifying regular oscillations that are then recorded by the counting register. These are dependent on physical variables such as temperature, air pressure, ambient humidity, etc. Therefore, the location of a network component can affect the quartz oscillator, and these changes can result in different clock or frequency rates of a hardware-based clock. While this often has no consequences for an isolated network component, time synchronization between the clocks of different network components that run at different frequencies can become necessary in the network having different network components.

In the case of a logical clock, the clock signal comes from the hardware, for example from a hardware-based clock, via an interrupt request. After switching on a network component, the logical clock has to be set first. A logical clock is a component of a computer system that can be used to supply events, such as workflows in a network, with a unique time stamp.

A time stamp is used to assign a unique point in time to an event. The accuracy of this time stamp decisively depends on the accuracy of a logic clock. Events are, for example, various physical workflows in a production plant, but they can also be of a digital nature, such as, e.g., communication between different network components. Movements of machine parts or goods, for example on a machine, or a processing step on a processing machine can take place as physical workflows. The physical workflows can be initiated or executed by network components designed as actuators and recorded by network components designed as sensors. In the event of a production failure, for example, it is possible to tell exactly based on the time stamp which machine was responsible for a failure and at what point in time. This significantly simplifies troubleshooting in highly complex production systems.

A clock of a network component can be configured both as a hardware-based clock and a logical clock or a combination thereof. For example, two logical clocks can use the same hardware-based clock. At least one hardware-based clock is usually installed in a network component, the clock in each case indicating at least a time in the network component. As a rule, such a time continues to count continuously from a first initialization, for example in predefined fractions of a second. In such a clock, the quartz oscillator acts as a clock generator. The clock can be constantly supplied with energy from a power source, i.e., a battery or a rechargeable battery, to ensure that this clock does not stop, even when the device is switched off. In the event of a loss of power, for example if the button battery on the motherboard is empty, this clock would start counting again, when a new voltage source is used.

For example, a logical clock now uses the hardware-based clock mentioned above to control workflows and supply events with a time stamp.

Unavoidable inaccuracies can occur in a network, for example because the built-in quartz oscillators do not oscillate at exactly the same frequency due to manufacturing inaccuracies. Furthermore, different locations of the network components can cause a frequency difference in the quartz oscillators to arise or increase due to external influences. Network components can be located together in a machine hall, or they can also be spatially separated from each other. For example, temperature differences caused by different outside temperatures, air conditioning and CPU heating can have an impact on the quartz oscillator.

In order to enable a time-controlled communication via various network components, it is necessary to synchronize the clocks in different network components in different domains of networks or in different networks, which have a different time. In the simplest case, one network component in the network is designated as a master and the other network components are designated as slaves. A network component that is a master can be a particularly powerful and fail-safe network component. The master predefines a time for the slaves in the network and thus regulates time synchronization. Normally, there are a plurality of masters in a network. It may also be possible for the master roles to change periodically between network components, for example in the event of a failure of a network component that acts as a master, or in the event of a failure of the connection between different parts of networks.

It may also be that different networks are coordinated or synchronized with one another in terms of time. Then there is a master for the time synchronization within each network. A master of a second network acts as a slave of the master of a first network for the time synchronization. The master of the second network acting as a slave is then synchronized with the master of the first network. Thereafter, the master of the second network can synchronize all slaves of the second network. A network hierarchy can also be established for this purpose, according to which the order in which the individual networks synchronize with one another is established. Thus, the master of the second network can predefine a dedicated time in the second network, which is being adjusted to a master time of the first network by time synchronization. For example, a network component can act as a master in a network as long as the network component does not receive a time synchronization of a master of a hierarchically higher-ranking network. It is conceivable, for example, that a network in a machine first carries out a time synchronization internally, wherein the network can run alone and itself contains network components, wherein at least one master and one slave are present. When this machine is integrated into production, it may then be necessary for the network of the machine to be synchronized with a hierarchically higher-ranking network, for example a network of the production system. It is also conceivable for different domains of a network to be synchronized by a master.

However, there is often not just one master for a clock in a network, but rather a plurality of masters, referred to as "standby masters." As long as the original master carries out the time synchronization with respect to a clock, the standby masters behave like slaves. If the first master fails, one of the standby masters can take over and carry out the time synchronization.

Furthermore, with regard to other tasks, masters for the time synchronization can only be simple slaves. In the present invention, the terms "master" and "slave" relate exclusively to the time synchronization in a network and not to other functionalities, such as in a production process. However, both master and slaves are network components in a network.

As a rule, the clocks in a network are adjusted by way of synchronization. A complete adjustment of the time is carried out between the master and slave. The slave adjusts both, the frequency and the time difference. The time difference is the specific difference between the clock of the master and the clock of the slave. For example, a master has a time of 13:02 and a slave has a time of 13:05. The time of the slave is now set from 13:05 to 13:02. Furthermore, based on the knowledge of the time in the master, the slave adjusts the frequency, for example based on synchronization messages from the master, so that the clocks run at the same speed. Precise adjustment of the frequencies can only be possible after a certain number of synchronization messages.

In order to avoid time jumps, where possible, the frequency of the slave can be accelerated or decelerated to adjust the clocks in the master and slave. However, this process can take a long time, if there are large deviations between the master and slave and can lead to persistent errors, especially in the frequency.

Sole adjustment of the frequencies can be carried out by way of synchronization. Synchronization shall be understood to mean the adaptation of the frequency between a master and a slave in a network, without any adjustment of a time difference, as used in the case of synchronization. The time of the slave would consequently not be corrected to the time of the master using a jump, as is the case in the example above, but the times would continue to run with the same difference. This prevents jumps in the clock and also avoids incorrect assignment of events, for example in work processes. However, by adapting the frequencies, this at least prevents the difference from becoming larger if both clocks have the same frequency.

The current prior art for time synchronization is the IEEE's Precision Time Protocol (PTP) standard (IEEE 1588). This standard provides that each clock in a network component is synchronized separately with a master via the network. For example, a clock can be synchronized with other clocks in the network based on the standard.

Synchronized applications, such as high-precision work or production processes, are controlled via at least one timer in a network component. A timer controls cyclic processes in a system by issuing an interrupt request, known as an interrupt, at regular intervals (cycle duration). With each interrupt, a cyclically recurring process (essentially a piece of program code running in the network component, a so-called interrupt service routine) is carried out. This can be important, for example, for current and future events, such as a step in a production process, which are to trigger at a predefined interrupt of the timer. A timer can trigger an interrupt every 100 microseconds (µs), for example, or also at longer or shorter time intervals. A timer is usually configured to trigger the desired or required interrupts.

When a production process is started, a predefined time is generally allowed to elapse until the clocks of all network components are synchronized and the cycle duration of all interrupts has also adjusted, since during starting, due to inaccuracies of the oscillating crystals, the cycle duration of the individual interrupts in the network components can have different frequencies, for example, or the interrupts of different network components do not occur simultaneously. It is also possible for a network component to output several different interrupts. This is possible, for example, if several processes access a network component, or the network component has to control several processes. Interrupts can then also have different cycle durations, for example 200 µs and 1000 µs.

However, a loss of the connection during an ongoing process may lead to problems in the time synchronization. A lost connection can occur, for example, unintentionally, via a loss of connectivity, for example disconnection of a cable or failure of a switch, modem or router, or loss of a GPS connection of a vehicle when entering a tunnel. Network components or entire hierarchically subordinate networks can then continue to operate system-internally, but can also switch into a shut-off or standby mode, shut down or, if no cutout switch is present, can also crash. When the network component is restarted or when the connection is re-established, the time synchronization can be lost until a subsequent synchronization message. It is also possible that interrupts then no longer run correctly.

However, there may also be desired interruptions in the connection, for example in the case of autonomously driving vehicles, which are disconnected from their base station over a certain period of time.

It can then happen that the cycle duration of the interrupts between the different network components diverges. In the prior art, the time between the slave and the master is adapted again using a single synchronization step. As a result, the actual cycle duration of the interrupt at the time of the synchronization message can in particular be shortened or also be extended. Consequently, this can lead to problems in the temporal sequence and stability of high-precision workflows, in which several network components can be involved.

SUMMARY

Embodiments provide time synchronization that prevents the interruptions of workflows.

According to embodiments, a time offset between the master time and the slave time is determined upon arrival of a synchronization message, that a first time fraction of the determined time offset, which corresponds to an integer multiple of the cycle duration of the at least one interrupt, is adjusted in at least one first synchronization step using a time jump, and that a second time fraction of the time offset, which corresponds to a non-integer multiple from the range −1.0 and 0.1 of the cycle duration of the at least one interrupt, is adjusted in a number of successive second synchronization steps using frequency alignment and/or a time jump, wherein, in each synchronization step of the number of second synchronization steps, an actual cycle duration that arises of the at least one interrupt deviates from the predefined cycle duration by no more than a predefined deviation.

This is advantageous since a very large time difference can be synchronized in at least one first synchronization step, without disrupting the real-time operation in production. Since the interrupts are generated at a much higher frequency compared to the reception of synchronization messages, these minor inaccuracies in the time synchronization after the first synchronization step are generally irrelevant. According to the invention, the second synchronization step is also configured in such a way that an actual cycle duration of the interrupt is only insignificantly extended or shortened, namely within a predefined deviation. The time synchronization can thus continue to be carried out, without jeopardizing ongoing workflows.

Advantageously, at least one interrupt-capable network component can correspond to at least one further, hierarchically subordinate network. A synchronization message is distributed via a further master to at least one network component in the at least one further, hierarchically subordinate network. It is thus possible to also distribute the time synchronization in further networks which are present in other domains or are hierarchically subordinate to the network. This can be the case, for example, with a machine that can both operate in a "stand alone" manner, but also be integrated into production. The machine must then both enable a time synchronization internally in the machine itself and be able to receive a time synchronization from a hierarchically superordinate network or master. Such networks are often connected via gateways, such as switches, modems or routers, and a gateway can then act as a further master in at least one further, hierarchically subordinate network. In the different networks, different or independent synchronization messages can thus also be distributed via the masters in the superordinate and hierarchically subordinate network.

Advantageously, in the case of a plurality of interrupts in the interrupt-capable network component, the least common multiple of the cycle times of the plurality of interrupts is used for the first synchronization step. There is often a plurality of interrupts in each network component, wherein the interrupts can control a wide variety of processes or control devices connected to a network component. This ensures that the time synchronization can be applied to all interrupts in a network component.

An integer multiple of the least common multiple of the cycle times of the plurality of interrupts is advantageously used for the first synchronization step. Thus, a time synchronization can be adapted to processes or controllers that use certain interrupts of the timer. For example, it is possible that a control device connected to a network component does not use every interrupt, but only triggers after a predefined number of interrupts.

Advantageously, in the case of a plurality of interrupts, the number of second synchronization steps is carried out based on the predefined smallest deviation of the interrupt duration. Thus, the second synchronization steps can also be adapted to a plurality of interrupts.

Embodiments are directed to a method for the time synchronization of at least one master and at least one slave in a network. The at least one master predefines a master time and sends at least one synchronization message with the master time via the network to the at least one slave, on which a slave time is running, which uses the synchronization message to adjust the slave time to the master time using synchronization. The at least one slave is an interrupt-capable network component of the network and uses a timer which accesses the slave time to generate at least one interrupt, which recurs at predefined cycle durations. A time offset between the master time and the slave time is determined upon arrival of a synchronization message, in which a first time fraction of the determined time offset is adjusted in at least one first synchronization step using a time jump, the first time fraction corresponding to an integer multiple of the cycle duration of the at least one interrupt, and a second time fraction of the determined time offset is adjusted in a number of successive second synchronization steps by frequency alignment and/or time step, wherein the second time fraction corresponds to a non-integer multiple in a range of −1.0 to 0.1 of the cycle duration of the at least one interrupt. In each of the number of second synchronization steps an actual occurring cycle duration of the at least one interrupt deviates from the predefined cycle duration by no more than a predefined deviation.

According to embodiments, in the case of a plurality n of interrupts in the interrupt-capable network component, the least common multiple of the cycle times of the plurality of interrupts can be used for the at least one first synchronization step. Further, an integer multiple of the least common multiple of the cycle times of the plurality of interrupts may be used for the at least one first synchronization step. Also, in the case of a plurality n of interrupts, the number of second synchronization steps can be carried out based on the predefined smallest deviation of the interrupt duration.

In embodiments, a further network, which is hierarchically subordinate to the network and that has a further master may be used as the interrupt-capable network component.

Embodiments are directed to a network that includes a plurality of network components, of which at least one network component is a master and at least one second network component is a slave with respect to a time synchronization. The at least one network component serving as the master has a master time and is designed to send at least one synchronization message to the at least second network component serving as the slave, which has a slave time and is designed to adjust the slave time to the master time using synchronization. At least one network component is an interrupt-capable network component and has a timer to generate at least one interrupt, which recurs at predefined cycle durations. A synchronization unit in the interrupt-capable network component is designed to determine a time offset between the master time and the slave time when a synchronization message arrives. The synchronization unit is designed to adjust a first time fraction of the determined time offset in at least one first synchronization step using a time jump, in which the first time fraction corresponds to an integer multiple of the cycle duration the at least one interrupt, and to adjust a second time fraction of the determined time offset in a number of successive second synchronization steps using a frequency alignment and/or a time jump, wherein the second time fraction corresponds to a non-integer multiple from a range of −1.0 to 0.1 of the cycle duration of the at least one interrupt. In each of the number of second synchronization steps, an actual occurring cycle duration of the at least one interrupt deviates from the predefined cycle duration by no more than a predefined deviation.

In embodiments, the synchronization unit can be designed, in the case of a plurality n of interrupts in the interrupt-capable network component, to use a least common multiple of the cycle times of the plurality of interrupts for the at least one first synchronization step. Further, the synchronization unit may be designed to also use an integer multiple of a least common multiple of the cycle times of the plurality of interrupts for the at least one first synchronization step. The synchronization unit may be designed, in the case of a plurality n of interrupts, to carry out the number of second synchronization steps based on the predefined smallest deviation of the interrupt duration.

In accordance with still yet other embodiments, the at least one interrupt-capable network component may be configured as a further network that is hierarchically subordinate to the network and has a further master.

Other exemplary embodiments and advantages of the present invention play be ascertained by reviewing the present disclosure and the accompanying drawing.

BRIEF DESCRIPTION OF THE DRAWINGS

The present invention is described in greater detail hereafter with reference to FIGS. 1 to 5, which show by way of example schematic and non-limiting advantageous embodiments of the invention. In the figures.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
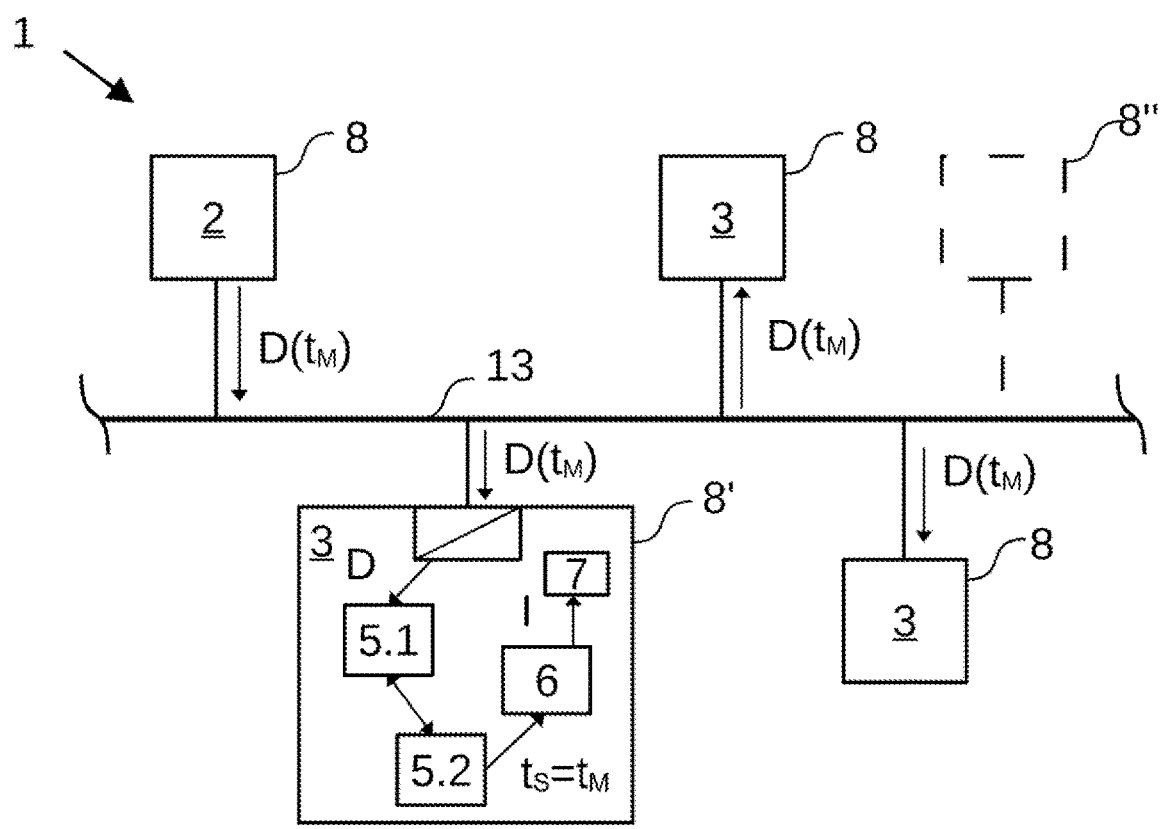
FIG. 1 shows a network according to the invention including a master and slaves.

FIG. 1 shows an exemplary network 1 including multiple network components 8, 8', 8", wherein at least one master 2 and multiple slaves 3 are present with respect to the time synchronization. The network components 8, 8', 8" are connected to one another via network lines 13. The network lines 13 often form a data bus for data communication between the network components 8, 8', 8", as is also shown in FIG. 1. The network lines 13 can be LAN cables, network buses, fiber optic cables and the like, which allow communication between the network components 8, 8', 8" in the network 1. Any communication protocol can be implemented for data communication. A network infrastructure can also be provided, which connects different networks 1 or different portions of a network 1 to one another, for example switches, routers, etc. Wireless data traffic having time synchronization over a wireless network, such as wireless LAN (WLAN), is also conceivable in a network 1 or in parts of a network 1. In this case, the network line 13 is a wireless connection between the network components 8, 8', 8". The network 1 may also be embodied as a mixed wired and wireless network 1. Any network topologies for the network 1 that are familiar to a person skilled in the art and that allow data transfer with time synchronization between the network components 8, 8', 8" are possible.

A plurality of different network components 8, 8', 8", such as processing units, bus modules, drive modules, bus couplers, IO modules having an integrated network connection, cameras, HMI devices, network-integrated sensors and actuators, etc., can be present in a network topology of a network 1. A network component 8, 8', 8" usually comprises a microprocessor 7 on which stored program code is executed. For this purpose, an operating system can be installed and run on a network component 8, 8', 8", wherein a wide variety of operating systems, such as Linux/Unix, Windows, Android and the like, can run on different network components 8, 8', 8".

Figure 2:
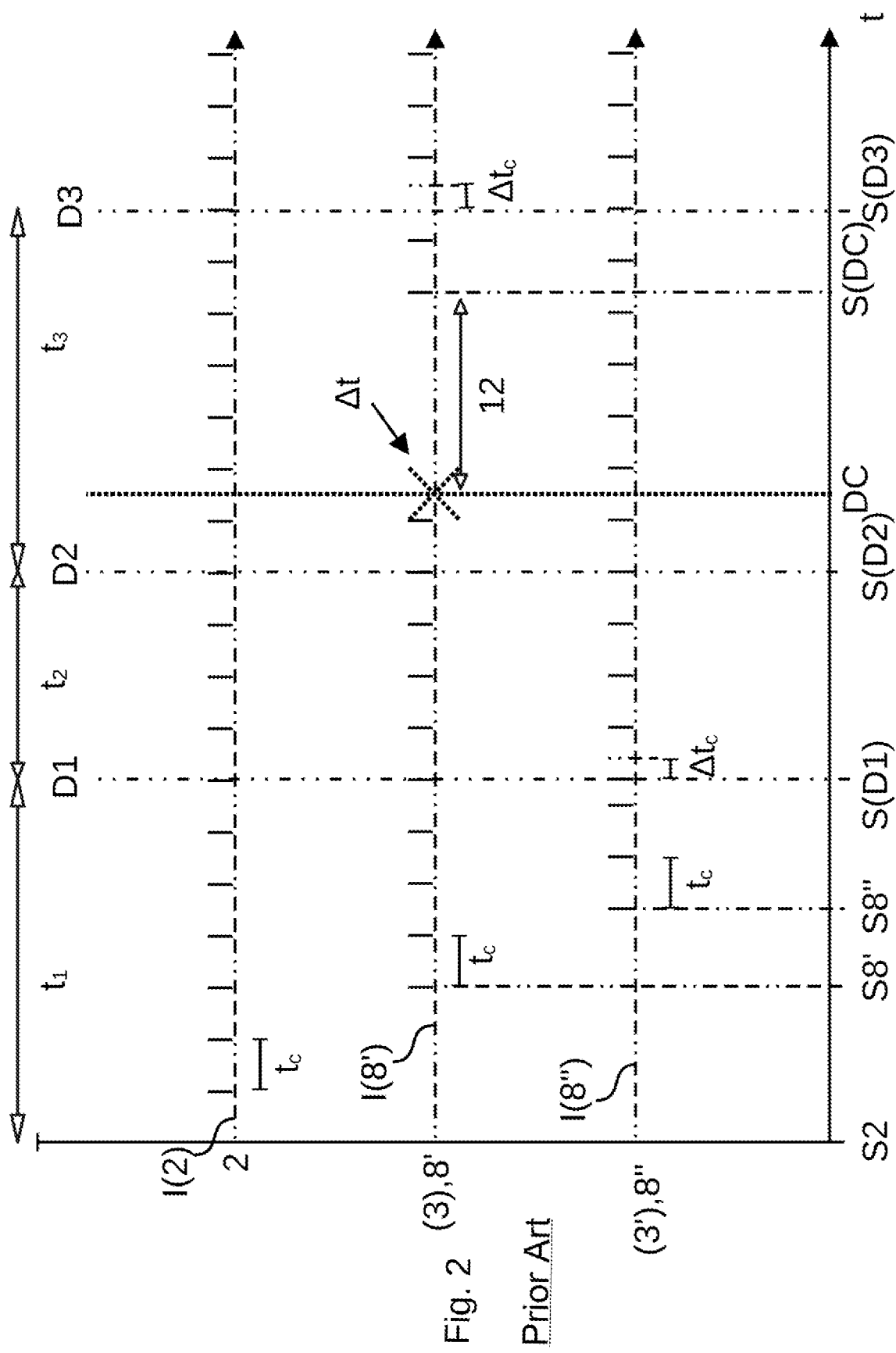
FIG. 2 shows the effects of time synchronization from the prior art ion different interrupts in different network components.

At least one interrupt-capable network component 8' is present in the network 1, which, in addition to a clock 5.2, also comprises a timer 6, which is provided to generate at least one interrupt I, which recurs at predefined regular cycle durations $t_C$, I as shown in FIG. 2. The interrupt I is preferably processed in the microprocessor 7, for example to control the sequence of program code. The timer 6 accesses the time of the clock 5.2 in the interrupt-capable network component 8' for this purpose. Since the interrupt-capable network component 8' is a slave 3 with respect to the time synchronization, the time of the clock 5.2 depends on the master time $t_M$ of the master 2 (network component 8), and therefore is a slave time $t_S$. Consequently, the timer 6 of a slave 3 uses the slave time $t_S$ to generate the interrupts I.

However, there may also be further interrupt-capable network components in the network 1, as indicated by dashed lines in FIG. 1.

A slave time $t_S$ not yet synchronized with respect to the master time $t_M$ can be different with respect to the absolute time and the frequency. For example, the slave time $t_S$ can differ from the master time $t_M$ by a certain period of time, such as several years, weeks, days, hours, etc., but have the same frequency. Thus, the absolute time would not be identical; the slave time $t_S$ in the slave 3, for example, can have the year 2019, and the master time $t_M$ in the master 2 can have the year 2021, however the master time $t_M$ and the slave time is would elapse at an equal pace. The nominal duration, for example, of one second is the same at the same frequency, i.e., the seconds elapse equally quickly in the master 2 and in the slave 3. However, it is also possible, and often likely, that neither the absolute time nor the frequency of the master 2 and the slave 3 are the same prior to synchronization. Therefore, a nominally identical cycle duration $t_C$ of an interrupt I in the master 2, or also of different slaves 3, can in fact be different at different frequencies of the slave 3 and the master 2, and the actually measured cycle durations $t_C$ can differ from one another. Different cycle durations $t_C$ can lead to problems in high-precision production processes, in which various network components 8, 8', 8" are involved, because the program codes controlled thereby do not run in a sufficiently synchronized manner, for example.

The master 2 usually sends a synchronization message D to the slaves 3 in the network 1. The synchronization message D contains the current master time $t_M$. For example, the synchronization message D can be received via a network port of the slave 3. The included master time $t_M$ is processed in the slave 3 in a synchronization unit 5.1. To this end, the synchronization unit 5.1 can also be implemented in the microprocessor 7. A synchronization unit 5.1 can be software-based and/or hardware-based and executes a program code or a hardware circuit. The synchronization unit 5.1 predefines a current slave time $t_S$ for the clock 5.2, which is matched to the master time $t_M$ from the synchronization message D. The synchronization unit 5.1 can also be integrated in the clock 5.2. The synchronization messages D can arrive at different slaves 3 at different times. This can depend on the position of the particular slave 3 in the network 1 and on the run time of the synchronization message D.

The synchronization unit 5.1, which in the usual implementation is essentially a corresponding program code running in the slave 3, for example a synchronization stack 10 (see FIG. 4), compares its own current slave time $t_S$ to the master time $t_M$ from the synchronization message D. The run time of the synchronization message D in the network 1 is preferably known and is taken into account by the synchronization unit 5.1 during the time synchronization. The synchronization unit 5.1 adjusts the absolute time and the frequency of the clock 5.2 to the master 2, so that, after the synchronization, the slave time $t_S$ corresponds to the master time $t_M$, as shown in FIG. 1. The frequency, for example, can be calculated with precision from the calculated time difference of several successive synchronization messages D.

The interrupts I generated by the timer 6 in the slave 3 can be of the same nominal cycle duration $t_C$; however, it is also possible for the cycle durations $t_C$ to differ according to a certain scheme. There may also be several interrupts I having different nominal cycle durations $t_C$ in a single interrupt-capable network component 8', 8".

To provide an easier understanding of the invention, different cycle durations $t_C$ are dispensed with in the following embodiments, without limiting the general nature, and all cycle durations $t_C$ correspond to the nominal cycle duration $t_C$ of the interrupt I(2) of the master 2, which can also be an interrupt-capable network component 8', 8". Furthermore, it is assumed that all slaves 3 receive the synchronization messages D at the same time.

The synchronization and the effects thereof on an interrupt I according to the prior art are shown in FIG. 2. The abscissa describes a system time t, and the ordinate corresponds to the different interrupts I(2), I(8'), I(8") in the network 1 as time bars. The master 2 has an interrupt I(2) with, for example, a cycle duration $t_C$ of 1 millisecond (ms). Furthermore, a slave 3 is present as an interrupt-capable network component 8' having an interrupt I(8'), and a further slave 3' is present as a further interrupt-capable network component 8" having an interrupt I (8"). Nominally, the interrupts I(8'), I(8") have the same cycle duration $t_C$ as the interrupt I(2) of the master 2. A real cycle duration $I_{C,R}$ in the respective network component 8', 8", however, can differ due to different frequencies of the clocks 5.2 in the interrupt-capable network components 8', 8" (slaves 3). For example, the actual cycle duration $t_{C,R}$ of the interrupt-capable network component 8' can be 1020 μs, while the cycle duration $t_{C,R}$ of the further interrupt-capable network component 8" can be 980 μs.

The points in time S2, S8', S8" of the interrupts I(2), I(8'), I(8") can be different, for example, when booting a PC or initializing a production machine, given in the time range t1. After a certain period of time, the master 2 sends the first synchronization message D1 via the network 1 to the slaves 3, 3'. As described above, the clocks 5.2 in the slaves 3, 3' are synchronized via the first synchronization message D1. The slave times is in the slaves 3, 3' are adjusted to the master time $t_M$ using a time jump.

In the described exemplary embodiment, it is assumed that all interrupts I(2), I(8'), I(8") are to run synchronously at the point in time S(D1). However, this is not always necessarily the case. The time jump of the clocks 5.2 at the point in time S(D1) results in the interrupt I(8") being shortened by an interrupt offset $\Delta t_C$. During booting or during the initialization, a single time jump, which fully adjusts the absolute time in the slave 3, such as at S(D1), can be unproblematic since shortening of the interrupt I(8") does not have any impact yet. Thus, for example, in the case of an interrupt I(8'), I(8"), that has a length of a nominal cycle duration $t_C$ of 1000 μs, only 600 μs may have elapsed. This interrupt I(8'), I(8") loses the interrupt offset $\Delta t_C$ or 400 μs as a result of the time jump and starts to run again. The interrupt of the master I(2) generally does not carry out any time jump. In the case of a change of the master 2, however, it may be quite possible that the interrupt I(2) of the previous master 2 again carries out time jumps as slave 3.

In the time range t2, between the first synchronization message D1 and a subsequent second synchronization message D2, the interrupts I(2), I(8'), I(8") continue to run unchanged and synchronously with one another. The length of the time between the successive synchronization messages D1 and D2 is not necessarily the same. The time range t2 can furthermore extend over a large number of synchronization messages D and represents the desired operating mode.

In the range t3, that is to say, for example, already during the operation of a production system, that is to say while production processes are ongoing and control tasks are being carried out, an interruption can take place at a point in time DC, and in the case of an interrupt-capable network component 8' can lead to an interruption, for example. As explained above, a mechanical cutting of a cable, a problem in the slave 3 or the like can cause this. The interrupt-capable network component 8' (slave 3), which is already running, can go into standby mode, start an error correction or carry out similar operations. In the event of an interruption, the interrupt-capable network component 8 loses the time synchronization. This failure 12 is indicated in FIG. 2. After the interruption, the interrupt I(8') can start at a different point in time, for example at the point in time S(DC). Alternatively, the interrupt I(8') can continue to run during the interruption, wherein this interrupt I(8') no longer has to run synchronously with the interrupts I(2), I(8") of the other network components 2, 8". The interruption caused a time offset $\Delta t$ between the master time $t_M$ and the slave time $t_S$. This time offset $\Delta t$ can correspond to the period of time of the failure 12. The time offset $\Delta t$, however, may also be any period of time (depending on how the slave 3 continues to operate). This time offset $\Delta t$ remains until a third synchronization message D3 arrives. A time offset $\Delta t$ correspond to an interrupt offset $\Delta t_C$, but often is greater by a multiple of the interrupt offset $\Delta t_C$. The interrupt offset $\Delta t_C$ is corrected at the point in time S(D3), similarly to the point in time S(D1), with a single time jump, and the interrupt I(8') is thus shortened at this point.

For example, at the point in time S(D3), the master 2 has run through an actual cycle duration $t_C$ of 1000 µs of the interrupt I(2), while only an actual cycle duration $t_{C,R}$ of 500 µs of the interrupt I(8'') has elapsed in the interrupt-capable network component 8' (even though this interrupt is also 1000 µs long nominally). During the time synchronization via the third synchronization message D3, the missing 500 µs of the interrupt I(8'), i.e., the interrupt offset $\Delta t_C$ of the interrupt-capable network component 8', is skipped and results in an actual cycle duration $t_C$ of the interrupt I(8') which is shortened by the interrupt offset $\Delta t_C$.

For example, a time offset $\Delta t$ can be 3500 µs between the master time $t_M$ and the slave time $t_S$, which, however, only corresponds, as described above, to an interrupt offset $\Delta t_C$ of 500 µs. This can lead to problems during high-precision work or production processes since the timer 6 triggers the next interrupt I(8') too early, for example. Even though the skipping is unproblematic during the initialization in the time range t1, this can lead to problems during operation, for example since a certain program code cannot be executed completely or control parameters, such as the determination of a speed, may be incorrectly calculated at defined times. Consequently, it may be necessary to interrupt a workflow in the network 1 in order to restore a correct flow of the interrupts I(8') following a loss of the time synchronization.

In the best case, such interruptions can cause a loss of time in production, or in the worst case, it can cause damage to machines or other parts.

Figure 3:
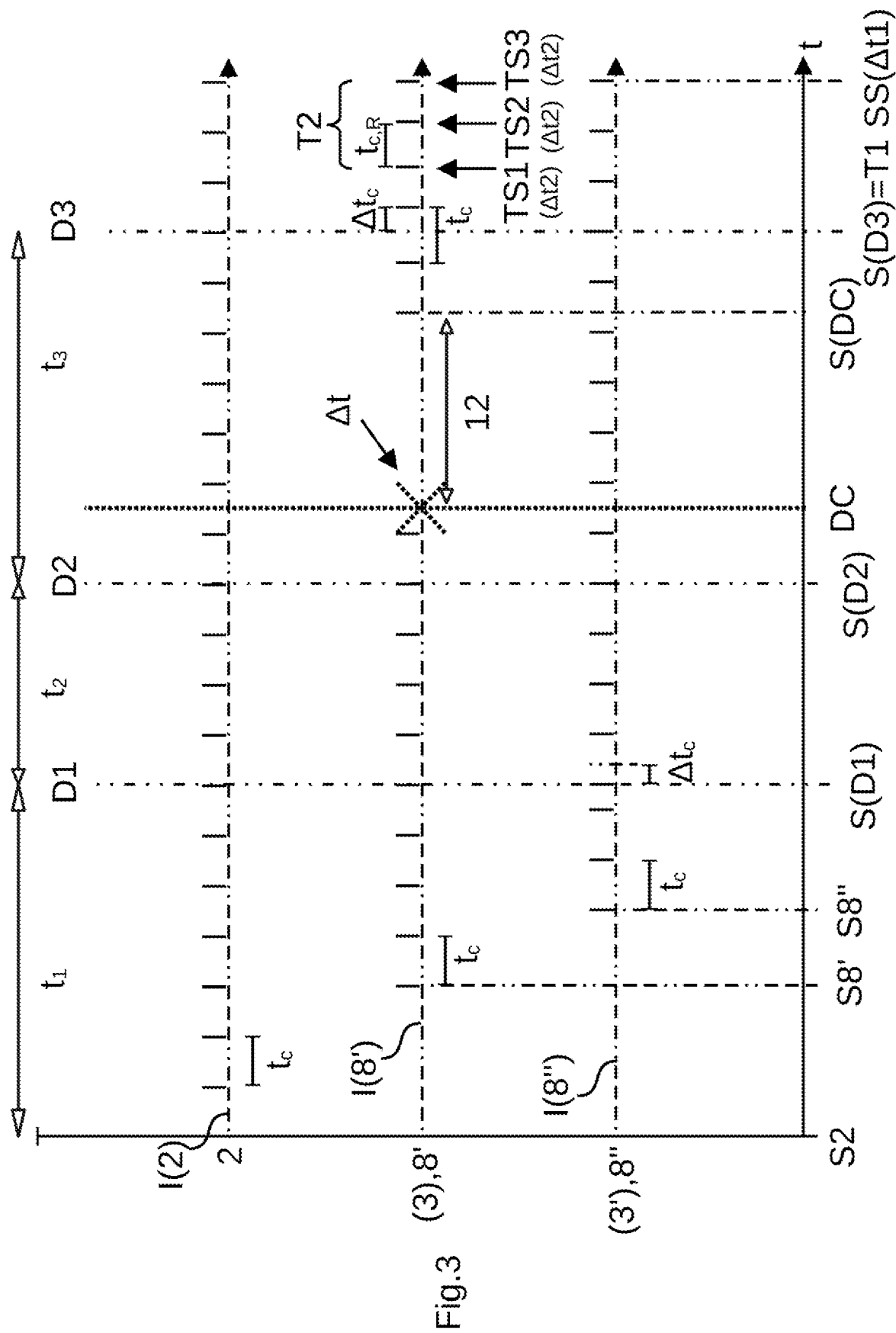
FIG. 3 shows time synchronization according to the invention and the effects thereof on different interrupts.

A synchronization according to the invention is illustrated in FIG. 3. The time range t1 and time range t2 correspond substantially to the time ranges t1 and t2 of FIG. 2. These are therefore not described again. However, it can also be provided that no time jumps of the interrupts I(2), I(8'), I(8'') are to take place after the interrupts I(2), I(8'), I(8'') have started, and therefore no shortening of the interrupts I(2), I(8'), I(8'') occurs. In an advantageous embodiment, no time jumps of the interrupts I(2), I(8'), I(8'') thus occur as soon as an application is started that uses the interrupts I(2), I(8'), I(8'').

In the time range t3 of FIG. 3, a loss of the time synchronization occurs in the interrupt-capable network component 8' at the point in time DC. The interrupt I(8') in the interrupt-capable network component 8' begins to run again after the interruption of the time synchronization, which is to say after a failure 12, or can also continue to run during the interruption, however the slave time $t_S$ is no longer corrected, for example, after a certain period of time. The slave time $t_S$ can slowly begin to deviate therefrom or to drift. As a result, the interrupt I(8') is temporally offset compared to the other interrupts I(2), I(8''). Alternatively, after the interruption at the point in time DC, the interrupt-capable network component 8' can start to operate again, regardless of the time synchronization.

At the point in time D3, the interrupt-capable network component 8' (as well as the other present slave 3') receives a third synchronization message D3 including the master time $t_M$. Depending on the interruption, the synchronization unit 5.1 can now establish a deviation in the absolute time and in the frequency in the interrupt-capable network component 8' compared to the master 2. According to the invention, a first time fraction $\Delta t_1$ of the time offset $\Delta t$ of the slave time $t_S$ relative to the master time $t_M$ is adjusted in at least one first synchronization step T1 wherein the first time fraction $\Delta t_I$ corresponds to an integer multiple of the cycle duration $t_C$ of the at least one interrupt I of the interrupt-capable network component 8' serving as the slave 3. After this first synchronization step T1, the time fraction $\Delta t_1$, which corresponds to an integer multiple of the cycle duration $t_C$, is thus adapted, with it being possible for a residual duration that has not yet been adjusted to remain. Thus, the first synchronization step T1, as is also shown in FIG. 3, has no impact on the interrupt I(8') in the interrupt-capable network component 8', i.e., the interrupts I(8') are still asynchronous, but remain approximately equidistant at the interrupt-capable network component 8'. As shown in FIG. 3, the first synchronization step T1 can take place in a single step, but it is also possible for multiple first synchronization steps T1 to be used.

For example, a cycle duration $t_C$ can be 1000 µs, as in the example above in FIG. 3, and the time offset $\Delta t$ of the slave time is from the master time $t_M$ can be 100,300 µs. At S(D3) in FIG. 3, the integer multiples of the cycle duration $t_C$ of the interrupt I, namely 100,000 µS—that is 100 times 1000 µS—are immediately corrected. The slave time $t_S$ is adapted by this value system-internally to the master time $t_M$. In the present invention, this integer multiple of the cycle duration $t_C$ is also referred to as a "rough offset." Using the following formula, the residual duration, the so-called "residual offSet," can be calculated in a first step. The character % describes a modulo operator, that is, a residual value determination, in the bottom formula. The residual offset is a calculation aid and, as will be described in greater detail below, is used in the case of a plurality of interrupts I in the interrupt-capable network component 8', 8'' as the slave 3 to determine the correct rough offset.

The time offset $\Delta t$ with respect to the master 2 and the cycle duration $t_C$ of the interrupt I are used to calculate the rough offset and the residual offset, which are both known:

$$\text{residual offset} = \left(\Delta t + \frac{t_C}{2}\right)\% \ t_C - \frac{t_C}{2} \text{ and}$$

$$\text{rough offset} = \Delta t - \text{residual offset}$$

In the example above, the determined time offset $\Delta t$ is 100,300 µs, i.e., the difference between the slave time $t_S$ and the master time $t_M$ at the point in time S(D3), the residual offset is 300 µs, and the rough offset is 100,000 µs. Since at this point in time S(D3) only integer multiples of the at least one interrupt I in the slave time $t_S$ are corrected, this first synchronization step T1 has no effect on the actual cycle duration $t_{C,R}$ of the interrupt I(8'). As a result, the started cycle duration $t_C$ is not interrupted. It is thus achieved that an adjustment of the slave time $t_S$ takes place in a first synchronization step T1, wherein a remaining second time fraction $\Delta t_2$ of the time offset $\Delta$ after the first synchronization step T1 is smaller than the cycle duration $t_C$ of the interrupt I(8'). Consequently, the second time fraction $\Delta t_C$ of the time offset $\Delta t$ after the first synchronization step T1 corresponds to the interrupt offset $\Delta t_C$, which corresponds to a non-integer multiple from the range ]−1.0[ and ]0.1[, according to:

$$\Delta t_2 = t_C * V; \ V \in \,]-1,0[;]0,1[$$

Consequently, according to the invention, this second time fraction $\Delta t_2$ of the time offset $\Delta t$ of the slave time $t_S$, which corresponds to a non-integer multiple V from the range ]−1.0[ and ]0.1[ of the cycle duration $t_C$ of the at least one interrupt I, is adjusted in a number of successive second synchronization steps T2 by frequency alignment and/or time jump. In each synchronization step T2 of the number of second synchronization steps T2, an actual cycle duration $t_{C,R}$ that arises of the at least one interrupt I deviates from the predefined cycle duration $t_C$ by no more than a predefined deviation dt. In a preferred embodiment, the interval of the second time fraction $\Delta t_2$ of the time offset $\Delta t$ of the slave time $t_S$ is the non-integer multiple V is In the range of]−½, 0[ and]0, ½[.

However, any other mathematical formulation is also conceivable for the person skilled in the art, which changes the residual offset in a form such that, as a result, the non-integer multiple V from the range ]−1.0[ and ]0.1[ of the cycle duration $t_C$ of the at least one interrupt I is used.

The number of second synchronization steps T2 is preferably carried out at the points in time of the interrupts I(8'). It is also possible for the second synchronization steps T2 to be recalculated and re-applied at the point in time at which a new synchronization message D is processed.

In this second synchronization step T2, the interrupt offset $\Delta t_C$ is thus corrected so that the predefined cycle duration $t_C$ an interrupt I is shortened or extended only by a predefined deviation dt. For example, the predefined deviation dt can be 10% of the cycle duration $t_C$ of the interrupt I. Consequently, an actual cycle duration $t_{C,R}$ of a 1000 μs long interrupt I can be adapted in the range of 900 μs to 1100 μs. The level of the predefined deviation dt can be dependent on the application and the required accuracy and is specified to the slave 3. Often, however, the deviation dt can be in a preferred range between 0.5 and 5%.

The above-described manner of correcting the interrupt offset $\Delta t_C$ ensures that a cycle duration $t_C$ of the interrupt I is not excessively shortened, which otherwise can lead to the problems described above.

After subtracting the rough offset in the at least one first synchronization step T1, the synchronization unit 5.1 can carry out a frequency alignment and/or a time jump in the slave 3. FIG. 3 shows the second synchronization steps T2, during which three time jumps TS1, TS2, TS3 are carried out by way of example. During these three second synchronization steps TS1, TS2, TS3, the actual cycle duration $t_{C,R}$ deviates from the predefined cycle duration $t_C$ of the interrupt I(8') by the predefined deviation dt and is shortened, for example. Thus, these three interrupts I(8') receive an actual cycle duration $t_{C,R}$ that is shorter than the predefined cycle duration $t_C$. The time jumps or frequency alignments are carried out by the synchronization unit 5.1, for example a clock servo 9 present in the synchronization unit 5.1, while adhering to the predefined deviation dt.

Figure 4:
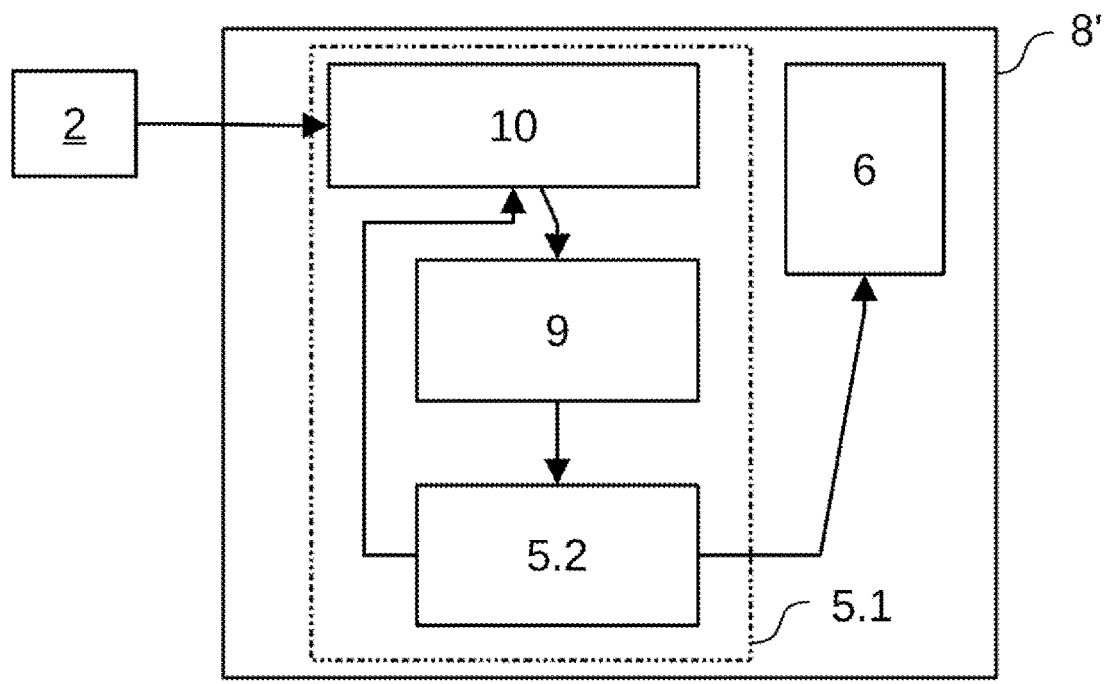
FIG. 4 shows the time synchronization mechanism according to the invention in a network component.

FIG. 4 shows an exemplary embodiment of an interrupt-capable network component 8' serving as a slave 3 having a synchronization unit 5.1 and including a clock 5.2 (other units of the slave 3 are not shown for the sake of simplicity). A time synchronization stack 10, for example a program code, calculates the time offset $\Delta t$ with respect to the master 2 via the synchronization message D or the master time $t_M$ contained therein. The clock servo 9 utilizes the time offset $\Delta t$ to carry out the time synchronization according to the invention and pass it on to the clock 5.2. The respective current time of the clock 5.2 is then specified to a timer 6.

The second synchronization step T2 can take place at a longer interval than synchronization messages D arrive at the slave. In a conventional implementation, the second synchronization step T2 can take place continuously until the slave time is corresponds to the master time $t_M$. It is possible, depending on the time offset $\Delta t$ after the at least one first synchronization step T1, that a second synchronization step T2 is carried out using a single step, for example by frequency correction, or using a number of steps TS1, TS2, TS3, e. g., using jumps as in FIG. 3. In the case of a frequency correction, a minimum shortening or extension of the base time units can take place. The base unit can be understood as a tick in a counting register, wherein the value that is added to the counting register with each tick is changed during the extension or shortening. For example, in a typical implementation, each tick (oscillation of the quartz) increments 8 ns (nanoseconds) of a counting register. If this base value is changed from 8 ns, for example, to 8.001 ns or 7.999 ns, a shortening (because counting is minimally faster) or an extension (because counting is slower) of the time results. The synchronization step T2 can thus also be understood as a phase, for example, wherein the remaining offset is reduced, continuously or in small jumps, during the phase.

For example, synchronization messages D can be sent every 1.25 milliseconds (ms), i.e., 8 times a second, from the master 2 via the network 1. A synchronization unit 5.1 can usually operate exactly at the spacing of the synchronization messages D.

However, it is also possible for the synchronization unit 5.1 to carry out the time synchronization at a much higher frequency, for example every 10 ms, and thus to carry out the time synchronization according to the invention between two successive synchronization messages D. The time basis of the synchronization messages D and the time basis of the time synchronization of the synchronization unit 5.1 carrying out the synchronization steps T1, T2 according to the invention can therefore be different. Likewise, the time basis of the interrupts I and of the second synchronization step T2 can be different.

In FIG. 3, the synchronization unit 5.1 synchronizes, by way of example, in such a way that the interrupt I(8') is matched in three steps TS1, TS2, TS3 to the remaining interrupts I(2), I(8"), which takes place via the shortening or extension of the base time units. Thereafter, all interrupts I(2), I(8), I(8") at the point in time SS continue to run with the predefined cycle duration $t_C$. A renewed synchronization message D has not yet arrived in this case.

The second time synchronization steps T2 are not necessarily triggered at the point in time of the interrupts I, as is mentioned above and shown in FIG. 3. It is possible to provide a higher number of time jumps or to carry out a frequency alignment additionally. According to the invention, the second synchronization step T2 must be configured in such a way that, during the synchronization, the actual cycle duration $t_{C,R}$ only deviates from the cycle duration to by the predefined deviation dt.

For illustration, the following table shows an exemplary progression of synchronization messages D and the time offsets $\Delta t$ of the slave time $t_S$. In the following example, the synchronization messages D are designated denoted by D0 to D2 for the sake of simplicity. Only when the synchronization message D is received is the remaining offset recalculated in this example, the frequency matched, and the spacing between the interrupts I reestablished. This takes place until the time at the slave 3 is equal to that of the master 2.

The slave 3 loses the synchronization with the master 2 before the synchronization message D0, for example for reasons described above. At D0, the slave 3 has a time offset $\Delta t$ of 100,300 μs. The synchronization unit 5.1 calculates the time offset $\Delta t$ and first carries out the at least first synchronization step T1 according to the invention. As mentioned, the at least first synchronization step T1 does not necessarily have to take place in a single step, but can also take place in several steps. At D0, the first synchronization step T1 was carried out, and the time offset $\Delta t$ is thus only 300 μs, which corresponds to the second fraction $\Delta t2$ of the time offset $\Delta t$ after the point in time of the synchronization message D0. However, this could also take place in two first synchronization steps T1, wherein, for example, only 50,000 µs is corrected in the synchronization message D0, and the second 50,000 µs (not shown here) is corrected in the further synchronization message D1. Between the synchronization messages D0 and D1, the synchronization unit 5.1 carries out multiple second synchronization steps T2, for example as a frequency alignment, wherein the maximum deviation dt is utilized by way of example with each second synchronization step T2. The time deviation identified with the synchronization message D0 is adjusted before the synchronization message D1.

Deviations can occur at a very wide variety of point in time due to changes in frequency and changes in the absolute time and cause the clocks 5.2 in the master 2 and in the slave 3 to diverge. Consequently, despite intermediate synchronization in the case of a new synchronization message D1, a new time offset Δt can be established. This is given by way of example at 1450 µs in the table with the synchronization message D1.

Now, the synchronization according to the invention proceeds as with the synchronization message D0, with a first synchronization step T1 and several second synchronization steps T2. As long as the time offset Δt is not an integer multiple of the cycle duration $t_C$ of the at least one interrupt I, only the second synchronization step T2 is carried out. This happens after the synchronization message D2 with a number of second synchronization steps T2,n.

| Time | Synchronization | $t_C$ [µs] | Time offset Δt [µs] | Rough offset [µs] |
|---|---|---|---|---|
| D0 | | 1000 | 100300 | 100000 |
| | T1 | | 300 | 0 |
| | T2 | | 200 | 0 |
| | T2 | | 100 | 0 |
| | | | 0 | 0 |
| D1 | | | 1450 | 1000 |
| | T1 | | 450 | 0 |
| | T2 | | 350 | 0 |
| | T2 | | 250 | 0 |
| | T2 | | 150 | 0 |
| D2 | | | 475 | 0 |
| | T2, n | | | |

In an advantageous embodiment, the cycle duration to of not just a single interrupt I in an interrupt-capable network component 8' is considered in the time synchronization, but also a plurality n of cycle durations of interrupts I. For example, a timer 6 can generate a first interrupt I1 having a first cycle duration $t_{C,1}$ and a second interrupt I2 having a second cycle duration $t_{C,2}$ in the interrupt-capable network component 8'. Likewise, several timers 6 can also be provided. For the time synchronization according to the invention, the least common multiple kgV of the existing cycle durations $t_{C,1}, \ldots, t_{C,n}$ is used to calculate a rough offset which is synchronized in the first synchronization step T1. The second synchronization step T2 is preferably carried out based on the predefined smallest deviation dt1 of the shortest interrupt duration $t_{C,1}, \ldots, t_{C,n}$ or the interrupt duration subject to the most stringent requirements. The calculations of the rough offset and of the residual offset can now take place as follows:

$$\text{residual offset} = \left(\Delta t + \frac{kgV(t_{C,1};\ldots,t_{C,n})}{2}\right)\% \, kgV(t_{C,1};\ldots,t_{C,n}) - \frac{kgV(t_{C,1};\ldots,t_{C,n})}{2} \text{ and}$$

$$\text{rough offset} = \Delta t - \text{residual offset}$$

As an example, an interrupt I1 having a first cycle duration $t_{C,1}$ of 200 µs and a second interrupt I2 having a second cycle duration $t_{C,2}$ of 300 µs can be generated in the interrupt-capable network component 8'. The least common multiple of the cycle durations $t_{C,1}$ and $t_{C,2}$ of the interrupts I1 and I2 then corresponds to 600 µs. The rough offset is therefore calculated from the least common multiple and can only be an integer multiple of the 600 µs, which can then be used in the first synchronization step T1. This ensures that no interruptions of an interrupt I by an interrupt offset $\Delta t_C$ occurs, even with a plurality of interrupts I1, I2.

It is also conceivable that two or even several networks that comprise a master and at least one slave are connected to one another. Each network can run autonomously and carry out a time synchronization as described above. However, there may also be applications or situations in which a network has to be synchronized in terms of time with another network. This may be necessary, for example, when booting a system with multiple networks connected to one another. The networks can start independently of one another, and each network can first internally carry out a described time synchronization. A network can thereafter be synchronized with another network. It is also conceivable for a network to be connected to another network. This can take place, for example, when a component (such as a machine) is added in a system that has a network. The time synchronization described above can also be used in such situations.

Figure 5:
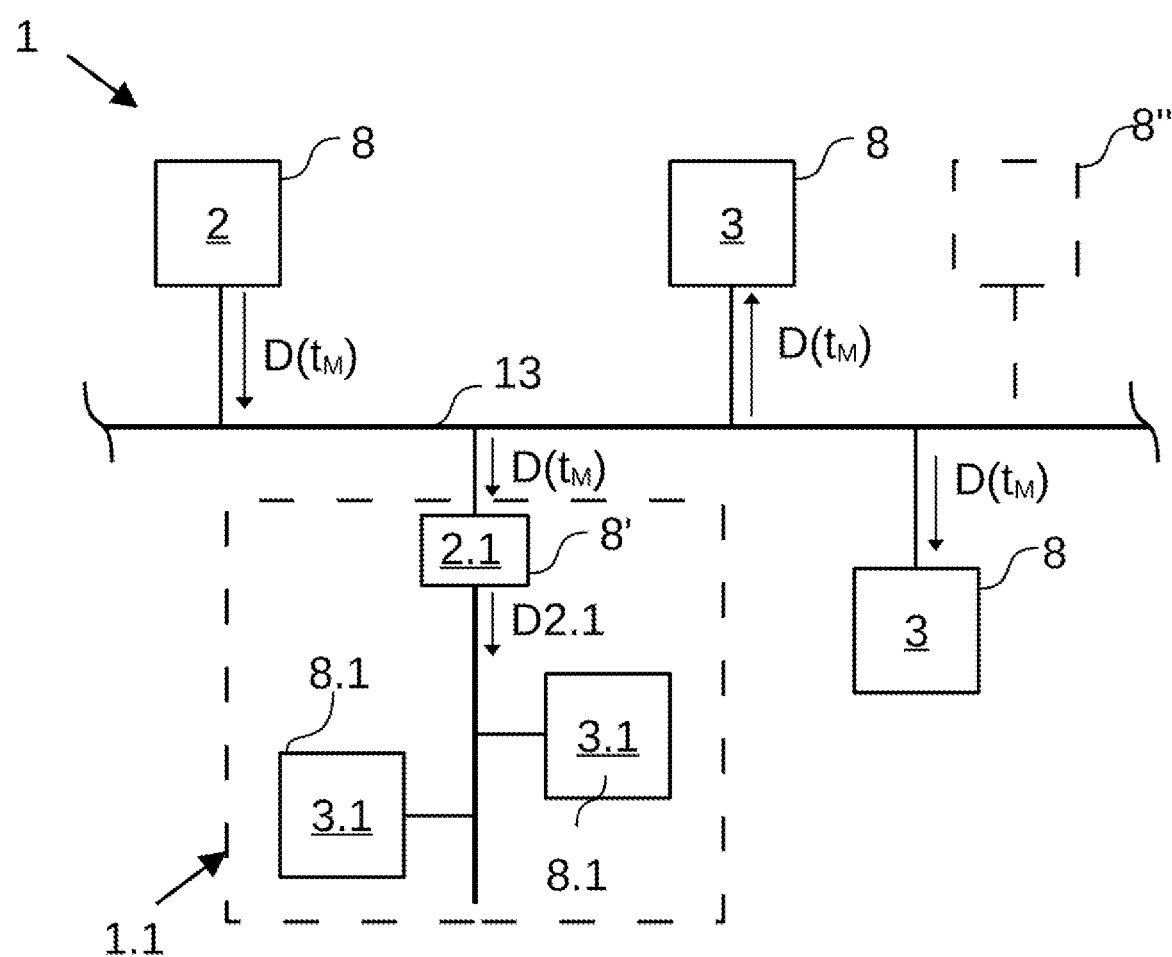
FIG. 5 a network including a master and slaves and a hierarchically subordinate network.

It is assumed in the process that a network 1, as described, comprises a first master 2 and at least one slave 3 (interrupt-capable network components 8, 8', 8"), as is shown in FIG. 5. A further network 1.1 likewise comprises a further master 2.1 and at least one slave 3.1. Within each network 1, 1.1, the time synchronization takes place, as described above, via synchronization messages D, D2.1 from the respective master 2, 2.1 into the respective network 1, 1.1. In order to synchronize the networks 1, 1.1 in terms of time, the further master 2.1 of the further network 1,1 acts as a slave of the network 1. The further master 2.1 is connected to the network 1 for this purpose, as shown in FIG. 5. The further master 2.1 acting as a slave of the network 1 is thus synchronized in terms of time via synchronization messages D from the master 2 of the network 1, as described above. Thus, the further master 2.1 can now synchronize the slaves 3.1 in terms of time in its own, further network 1.1 by the synchronization message D2.1, as described above.

For this purpose, it is advantageous if a network hierarchy is established, which predefines which network 1, 1.1 operates, for the time synchronization, as a further or subordinate network 1.1 which synchronizes with the (superordinate) network 1.

When the clock in the further master 2.1 is being matched, however, the master must take into account all relevant cycle times of the interrupts I of the slaves 3.1 (and of its own interrupts) and use these, for example, according to the above-described formula for a plurality of interrupts I in order to enable time synchronization according to the invention.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for the time synchronization of at least one master and at least one slave in a network,
    wherein the at least one master predefines a master time and sends at least one synchronization message with the master time via the network to the at least one slave,
    wherein the at least one slave, on which a slave time is running, uses the synchronization message to adjust the slave time to the master time using synchronization,
    wherein the at least one slave is an interrupt-capable network component of the network and uses a timer which accesses the slave time to generate at least one interrupt, which recurs at predefined cycle durations,
    wherein, a time offset between the master time and the slave time is determined upon arrival of a synchronization message,
    wherein a first time fraction of the determined time offset is adjusted in at least one first synchronization step using a time jump, the first time fraction corresponding to an integer multiple of the cycle duration of the at least one interrupt,
    wherein a second time fraction of the determined time offset is adjusted in a number of successive second synchronization steps by frequency alignment and/or time step, wherein the second time fraction corresponds to a non-integer multiple in a range of −1.0 to 0.1 of the cycle duration of the at least one interrupt, and
    wherein in each of the number of second synchronization steps an actual occurring cycle duration of the at least one interrupt deviates from the predefined cycle duration by no more than a predefined deviation.

2. The method according to claim 1, wherein, in the case of a plurality n of interrupts in the interrupt-capable network component, the least common multiple of the cycle times of the plurality of interrupts is used for the at least one first synchronization step.

3. The method according to claim 2, wherein an integer multiple of the least common multiple of the cycle times of the plurality of interrupts is used for the at least one first synchronization step.

4. The method according to claims 2, wherein, in the case of a plurality n of interrupts, the number of second synchronization steps is carried out based on the predefined smallest deviation of the interrupt duration.

5. The method according to claim 1, wherein a further network, which is hierarchically subordinate to the network and that has a further master is used as the interrupt-capable network component.

6. A network comprising a plurality of network components, wherein at least one network component is a master and at least one second network component is a slave with respect to a time synchronization,
    wherein the at least one network component serves as the master has a master time and is designed to send at least one synchronization message to the at least second network component serving as the slave, which has a slave time, and the at least second network component, which serves as slave, is designed to adjust the slave time to the master time using synchronization,
    wherein at least one network component is an interrupt-capable network component and has a timer to generate at least one interrupt, which recurs at predefined cycle durations,
    wherein a synchronization unit in the interrupt-capable network component is designed to determine a time offset between the master time and the slave time, when a synchronization message arrives,
    wherein the synchronization unit is designed to adjust a first time fraction of the determined time offset in at least one first synchronization step using a time jump, wherein the first time fraction corresponds to an integer multiple of the cycle duration the at least one interrupt,
    wherein the synchronization unit is designed to adjust a second time fraction of the determined time offset in a number of successive second synchronization steps using a frequency alignment and/or a time jump, wherein the second time fraction corresponds to a non-integer multiple from a range of −1.0 to 0.1 of the cycle duration of the at least one interrupt, and
    wherein in each of the number of second synchronization steps an actual occurring cycle duration of the at least one interrupt deviates from the predefined cycle duration by no more than a predefined deviation.

7. The network according to claim 6, wherein the synchronization unit is designed, in the case of a plurality n of interrupts in the interrupt-capable network component, to use the least common multiple of the cycle times of the plurality of interrupts for the at least one first synchronization step.

8. The network according to claim 7, wherein the synchronization unit is designed to also use an integer multiple of the least common multiple of the cycle times of the plurality of interrupts for the at least one first synchronization step.

9. The network according to claim 7, wherein the synchronization unit is designed, in the case of a plurality n of interrupts, to carry out the number of second synchronization steps based on the predefined smallest deviation of the interrupt duration.

10. The network according to claim 6, wherein the at least one interrupt-capable network component is configured as a further network that is hierarchically subordinate to the network and has a further master.

* * * * *